(12) United States Patent
Zhong et al.

(10) Patent No.: US 10,366,034 B2
(45) Date of Patent: Jul. 30, 2019

(54) INFRASTRUCTURE MANAGEMENT SYSTEM WITH SUPPORT FOR BREAKOUT CABLES

(71) Applicant: CommScope Inc. of North Carolina, Hickory, NC (US)

(72) Inventors: Yu Zhong, Allen, TX (US); Ryan Enge, Carrollton, TX (US); Lary Blake Van Scoy, Allen, TX (US); LeaAnn Harrison Carl, Plano, TX (US); Michael G. German, Secaucus, NJ (US); Danny L. Satterthwaite, Allen, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 289 days.

(21) Appl. No.: 15/158,071

(22) Filed: May 18, 2016

(65) Prior Publication Data

US 2017/0337150 A1 Nov. 23, 2017

(51) Int. Cl.
*G06F 13/40* (2006.01)
*G02B 6/44* (2006.01)

(52) U.S. Cl.
CPC ......... *G06F 13/4068* (2013.01); *G02B 6/444* (2013.01); *G02B 6/4471* (2013.01)

(58) Field of Classification Search
None
See application file for complete search history.

(56) References Cited

U.S. PATENT DOCUMENTS

| 6,222,908 | B1 | 4/2001 | Bartolutti et al. |
| 6,234,830 | B1 | 5/2001 | Ensz et al. |
| 6,285,293 | B1 | 9/2001 | German et al. |
| 6,302,699 | B1 | 10/2001 | Conorich et al. |
| 6,330,307 | B1 | 12/2001 | Bloch et al. |
| 6,350,148 | B1 | 2/2002 | Bartolutti et al. |
| 6,424,710 | B1 | 7/2002 | Bartolutti et al. |
| 6,499,861 | B1 | 12/2002 | German et al. |
| 6,522,737 | B1 | 2/2003 | Bartolutti et al. |
| 7,605,707 | B2 | 10/2009 | German et al. |
| 8,075,348 | B2 | 12/2011 | Mei et al. |
| 8,092,249 | B2 | 1/2012 | German et al. |

(Continued)

OTHER PUBLICATIONS

International Serch Authority, "International Search Report for PCT/US2016/033129", "Foreign Counterpart to U.S. Appl. No. 15/158,071", dated Feb. 6, 2017, pp. 1-12, Published in: WO.

*Primary Examiner* — Henry Tsai
*Assistant Examiner* — Christopher A Bartels
(74) *Attorney, Agent, or Firm* — Fogg & Powers LLC

(57) ABSTRACT

One embodiment is directed to a method of tracking, using an automated infrastructure management (AIM) system, connections made using a breakout cable. The breakout cable comprises a plurality of breakout connectors at a breakout end of the breakout cable. The method comprises identifying a sequence for adding or removing connections involving the breakout connectors of the breakout cable, identifying events associated with adding or removing connections involving the breakout connectors of the breakout cable, and associating the breakout connectors of the breakout cable with added or removed connections based on the identified sequence and the identified events. Other embodiments are disclosed.

21 Claims, 18 Drawing Sheets

(56) References Cited

U.S. PATENT DOCUMENTS

| | | | |
|---|---|---|---|
| 8,116,434 B2 | 2/2012 | German et al. | |
| 8,203,450 B2 | 6/2012 | German et al. | |
| 8,398,441 B2 | 3/2013 | Mei et al. | |
| 8,467,655 B2 | 6/2013 | German et al. | |
| 8,574,014 B2 | 11/2013 | Mei et al. | |
| 8,643,476 B2 | 2/2014 | Pinn et al. | |
| 8,649,651 B2 | 2/2014 | German et al. | |
| 8,954,763 B2 | 2/2015 | German et al. | |
| 8,994,547 B2 | 3/2015 | German | |
| 9,081,537 B2 | 7/2015 | Sybesma et al. | |
| 9,123,217 B2 | 9/2015 | Pinn et al. | |
| 9,160,117 B2 | 10/2015 | German et al. | |
| 9,338,525 B2 | 5/2016 | Pinn et al. | |
| 9,535,221 B2 * | 1/2017 | Bradley | G02B 6/3869 |
| 9,746,631 B1 * | 8/2017 | Lane | G02B 6/4452 |
| 2004/0020232 A1 * | 2/2004 | Marquardt | E04F 15/024 62/259.2 |
| 2005/0105873 A1 * | 5/2005 | Reagan | G02B 6/4452 385/135 |
| 2006/0148279 A1 | 7/2006 | German et al. | |
| 2006/0160395 A1 | 7/2006 | Macauley et al. | |
| 2006/0160396 A1 | 7/2006 | Macauley et al. | |
| 2008/0122579 A1 | 5/2008 | German et al. | |
| 2009/0166404 A1 * | 7/2009 | German | G02B 6/3895 235/375 |
| 2010/0210315 A1 | 8/2010 | Miyake | |
| 2010/0322580 A1 * | 12/2010 | Beamon | G02B 6/4452 385/135 |
| 2010/0322582 A1 * | 12/2010 | Cooke | G02B 6/4452 385/135 |
| 2011/0068823 A1 | 3/2011 | German et al. | |
| 2011/0129186 A1 * | 6/2011 | Lewallen | G02B 6/3825 385/59 |
| 2011/0200294 A1 * | 8/2011 | Case | G02B 6/3825 385/135 |
| 2012/0246351 A1 * | 9/2012 | Sybesma | G06F 1/16 710/16 |
| 2012/0301083 A1 * | 11/2012 | Carter | H04Q 1/09 385/76 |
| 2013/0164980 A1 | 6/2013 | Mei et al. | |
| 2013/0260602 A1 | 10/2013 | German et al. | |
| 2014/0111346 A1 | 4/2014 | Pinn et al. | |
| 2015/0016788 A1 * | 1/2015 | Buff | G02B 6/4472 385/100 |
| 2015/0309278 A1 * | 10/2015 | Ellison | G02B 6/4452 385/135 |
| 2016/0057021 A1 | 2/2016 | Polland | |
| 2016/0091687 A1 * | 3/2016 | Irwin | H04B 10/12 385/135 |
| 2016/0132532 A1 | 5/2016 | German et al. | |

* cited by examiner

100

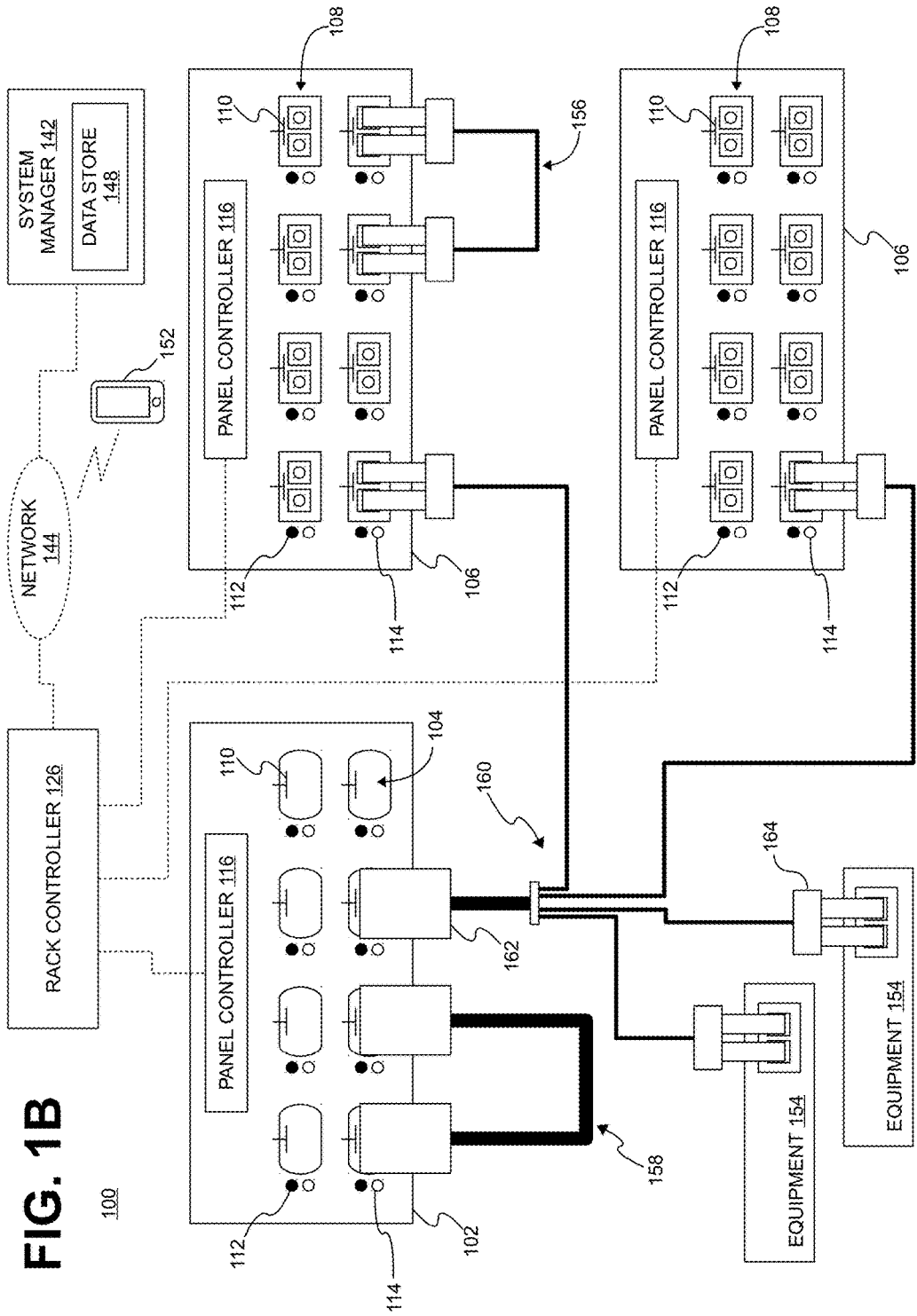

INFRASTRUCTURE MANAGEMENT SYSTEM WITH SUPPORT FOR BREAKOUT CABLES

BACKGROUND

Patching equipment is typically used to connect various network devices such as rack-mounted devices (such as switches, routers, and server computers) and end-user devices (such as desktop computers, laptop computers, printers, copiers, scanners, video conferencing equipment, and telephony devices).

One type of patching equipment is a patch panel. Patch panels are typically mounted in industry standard racks. A patch panel typically includes a first side (also referred to here as the "front" or "patching" side) comprising a plurality of ports where connectors attached to cables (for example, patch cords) can be attached. Each port is typically coupled to a corresponding second cable that is connected to the port via a second side (also referred to here as the "back" or "distribution" side) of the patch panel. The patch panel is configured to provide convenient access to the front side of the patch panel so that connections can easily be made and changed at the ports of the patch panel.

Historically, connections made using patching equipment have been tracked manually using, for example, a paper or computer-based log. However, such manual systems are often not consistently and accurately maintained. If a technician neglects to update the log each and every time a change is made, and/or makes errors in logging changes, then the log will no longer be fully accurate.

To address these issues, automated infrastructure management (AIM) systems have been developed to assist in automatically tracking connections made using patching equipment. One type of automated infrastructure management system infers connections between ports of patching equipment based on the timing of events occurring at the ports of the patching equipment. The patching equipment includes sensors to detect when connection and disconnection events occur at the ports of the patching equipment. One or more controllers are coupled to the various items of patching equipment and monitor the events occurring at the ports of the patching equipment.

For example, when a first connection event occurs at a port of a first item of patching equipment followed shortly thereafter by a second connection event occurring at a port of a second item of patching equipment, a controller can infer that a connection exists between these two ports. In this example, it is assumed that the patch cord used to make such a connection is a standard cable. As used herein, a "standard" cable refers to a cable where each end of the cable is terminated with a single connector (for example, a single simplex connector or a single multi-line connector such as a single duplex connector or single multi-fiber push on (MPO) connector).

However, inference rules and workflows that are designed for use with standard (point-to-point) cables may not work properly when used with cables having other topologies. For example, a "breakout cable" refers to a cable having at least one "breakout end." A breakout end of a cable is an end of a cable that is terminated with multiple, independent connectors, each of which can be used to make a patch connection independently of the other connectors at that breakout end of the cable. Typically, each connector at the breakout end of a cable terminates a respective one or more lines (for example, fibers or metal wires) that are bundled together within the cable.

One example of a breakout cable is an MPO break-out or fan-out cable, where one end of the break-out cable is terminated with a single MPO connector (for example, a single 12-fiber MPO connector) and the other end of the break-out cable is terminated with multiple, independent duplex LC connectors (for example, 6 duplex LC connectors). Each of the multiple, independent duplex LC connectors from such a break-out cable can be used to make a patch connection independently of the other multiple, independent duplex LC connectors from the same break-out cable.

SUMMARY

One embodiment is directed to a method of tracking, using an automated infrastructure management (AIM) system, connections made using a breakout cable comprising a plurality of breakout connectors at a breakout end of the breakout cable. The method comprises identifying a sequence for adding or removing connections involving the breakout connectors of the breakout cable; identifying events associated with adding or removing connections involving the breakout connectors of the breakout cable; and associating the breakout connectors of the breakout cable with added or removed connections based on the identified sequence and the identified events.

Another embodiment is directed to a system comprising a plurality of items of patching equipment, each of which comprises a plurality of ports, and at least one controller comprising a display device and a user-input device. The controller is configured to track connections made using a breakout cable comprising a plurality of breakout connectors at a breakout end of the breakout cable by: identifying a sequence for adding or removing connections involving the breakout connectors of the breakout cable; identifying events associated with adding or removing connections involving the breakout connectors of the breakout cable; and associating the breakout connectors of the breakout cable with added or removed connections based on the identified sequence and the identified events.

DRAWINGS

FIGS. 1A-1D illustrate one exemplary embodiment of an automated infrastructure management (AIM) system.

Like reference numbers in the various figures indicate like elements.

DETAILED DESCRIPTION

Figure 1A:
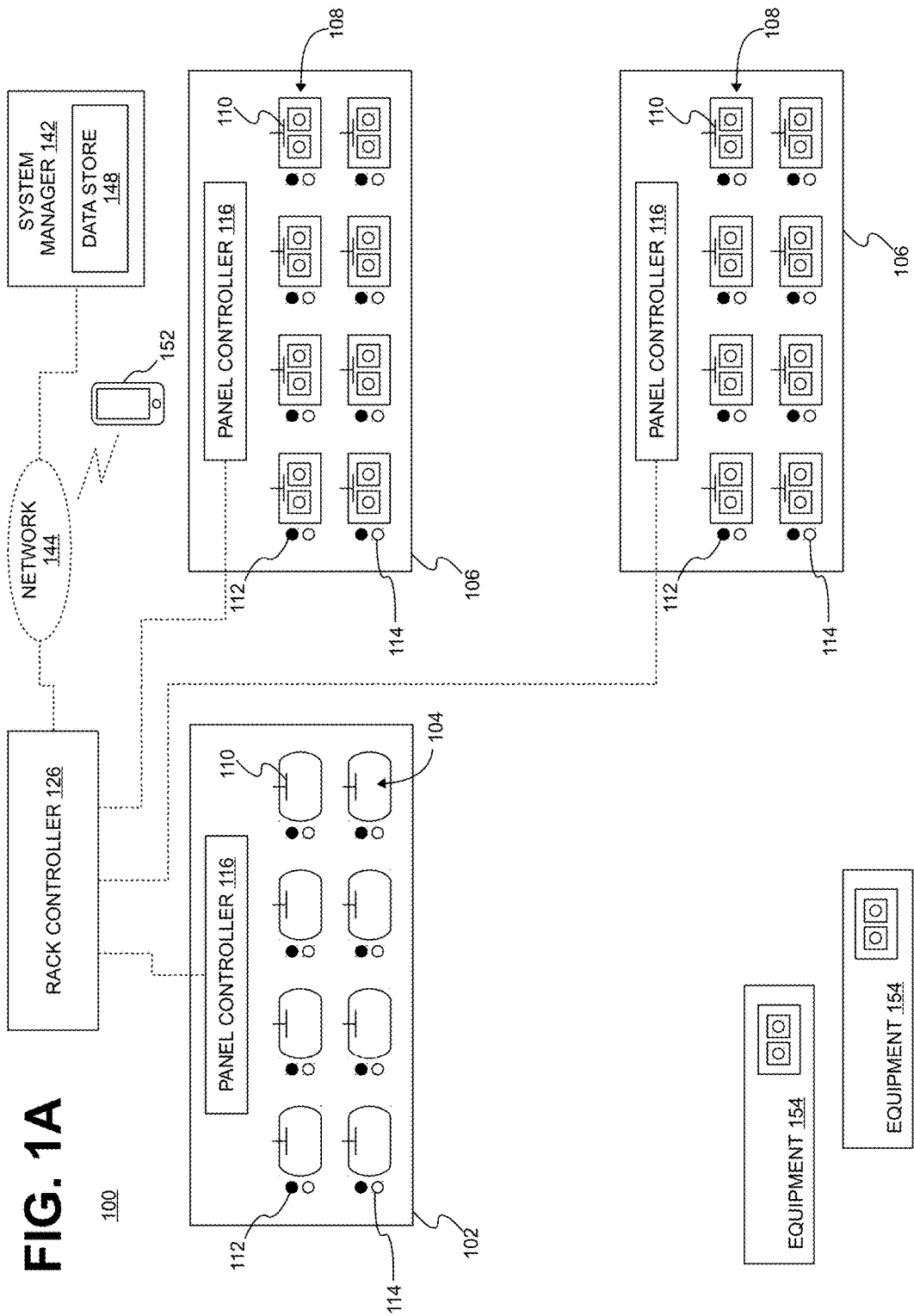
Figure 1C:
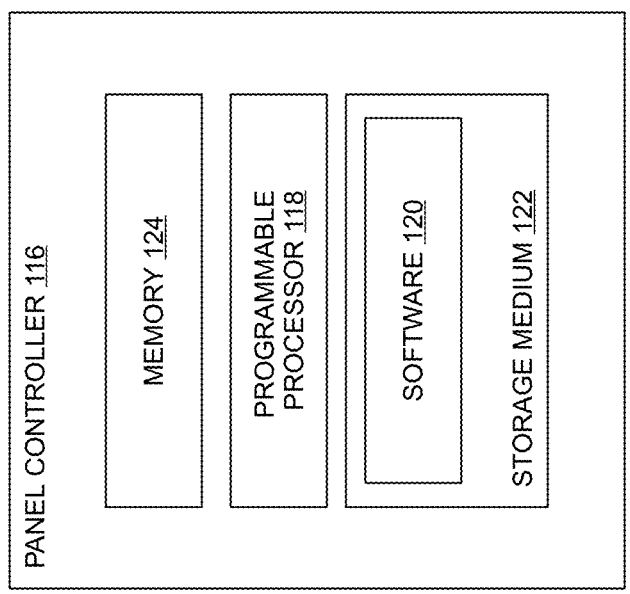

FIGS. 1A-1D illustrate one exemplary embodiment of an automated infrastructure management (AIM) system 100. FIGS. 1A-1B are collectively referred to here as "FIG. 1." FIG. 1A illustrates the AIM system 100 without any patch cables attached to the patch panels. FIG. 1B illustrates the AIM system 100 with patch cables attached to the patch panels. FIG. 1C is a block diagram illustrating details regarding the panel controller 116 shown in FIGS. 1A-1B.

Figure 1D:
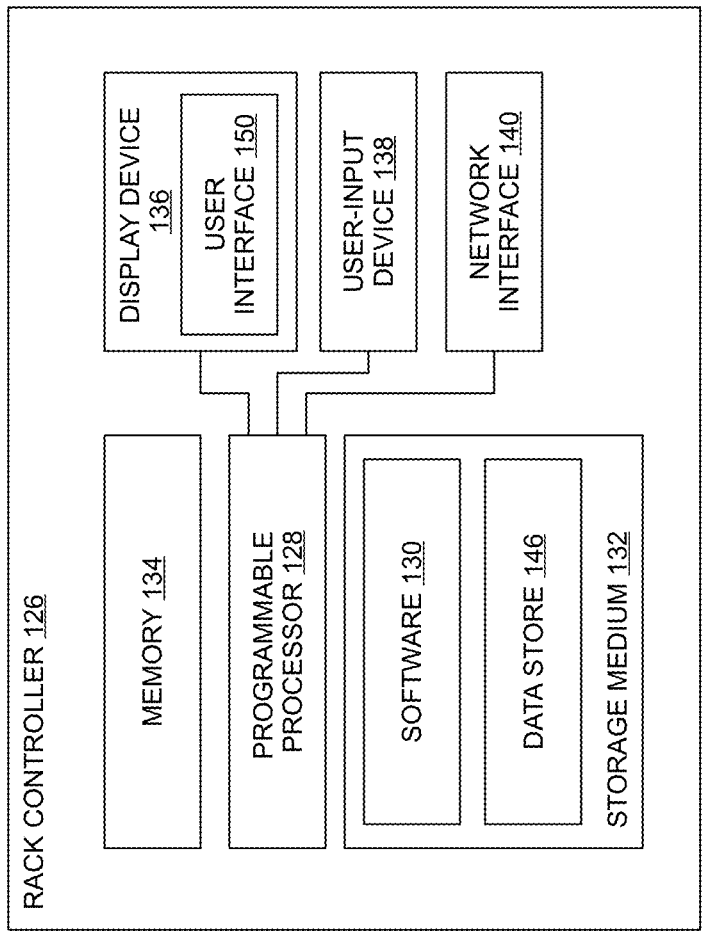

FIG. 1D is a block diagram illustrating details regarding the rack controller 126 shown in FIGS. 1A-1B.

The exemplary embodiment shown in FIG. 1 is described here as being used with optical fiber cables and fiber patching equipment. However, is to be understood that other embodiments can be implemented in other ways (for example, using non-fiber cables (such as a twisted-pair copper cables) and non-fiber patching equipment and/or using combinations of both fiber cables and patching equipment and non-fiber cables and patching equipment).

The system 100 shown in FIG. 1 can be implemented in a data center or enterprise application. Other embodiments can be implemented in other ways (for example, where the system 100 is implemented in a central office or other facility of a telecommunication service provider and/or in another part of the telecommunication service provider's network).

The AIM system 100 comprises a plurality of items of patching equipment. In the exemplary embodiment shown in FIG. 1, the patching equipment includes a first type of patch panel 102 having a first side (also referred to as the "front" or "patching" side) comprising a plurality of MPO ports 104 where MPO connectors attached to cables can be attached. This first type of patch panel 102 is also referred here as an "MPO patch panel" 102.

In this exemplary embodiment, each MPO port 104 of each MPO patch panel 102 is coupled to a corresponding second cable (such as an MPO trunk cable) (not shown) that is connected to the port 104 via a second side (also referred to as the "back" or "distribution" side) of each MPO patch panel 102. Each MPO patch panel 102 is configured to provide convenient access to the front side of the patch panel 102 so that connections can easily be made and changed at the MPO ports 104.

For ease of illustration, each MPO patch panel 102 is shown in FIG. 1 as having two rows of four MPO ports 104. However, it is to be understood that each MPO patch panel 102 can include any number of MPO ports 104 and rows of MPO ports 104.

In the exemplary embodiment shown in FIG. 1, the patching equipment includes a second type of patch panel 106 having a first side (also referred to as the "front" or "patching" side) comprising a plurality of duplex LC ports 108 where duplex LC connectors attached to duplex optical cables can be attached. This second type of patch panel 106 is also referred here as an "LC patch panel" 106.

In this exemplary embodiment, each LC port 108 of each LC patch panel 106 is coupled to a corresponding second cable (such as a duplex fiber cable) (not shown) that is connected to the port 108 via a second side (also referred to as the "back" or "distribution" side) of each LC patch panel 106. Each LC patch panel 106 is configured to provide convenient access to the front side of the patch panel 106 so that connections can easily be made and changed at the LC ports 108.

For ease of illustration, each LC patch panel 106 is shown in FIG. 1 as having two rows of four LC ports 108. However, it is to be understood that each LC patch panel 106 can include any number of LC ports 108 and rows of LC ports 108.

In this exemplary embodiment, the MPO patch panels 102 and LC patch panels 106 are mounted in racks (not shown in FIG. 1).

In this exemplary embodiment, each port 104 and 108 of the patch panels 102 and 106 includes a respective sensor 110 for detecting the connection or disconnection of a connector from that port 104 or 108.

Also, in this exemplary embodiment, each port 104 and 108 of the patch panels 102 and 106 includes a respective visual indicator 112 for providing a visual indication to a user, for example, to enable the user to visually identify that particular port 104 or 108. Each visual indicator 112 can be implemented using a light emitting diode (LED) and is also referred to here as "LED" 112. Each visual indicator 112 can be implemented in other ways.

Also, in this exemplary embodiment, each port 104 and 108 of the patch panels 102 and 106 includes a respective user-input device 114 by which a user is able to select that port 104 or 108. Each user-input device 114 can be implemented using a button and is also referred to here as "button" 114. Each user-input device 114 can be implemented in other ways.

Each patch panel 102 and 106 includes a respective panel controller 116 that is communicatively coupled to the respective sensor 110, LED 112, and button 114 associated with each port 104 and 108 in that patch panel 102 and 106. The panel controller 116 is configured to identify connection or disconnection events occurring at the ports 104 and 108 of that patch panel 102 and 106 via the sensors 110, to illuminate or otherwise actuate the LEDs 112 associated with the ports 104 and 108, and to receive any signals provided via the buttons 114 associated with the ports 104 and 108 (for example, signals associated with pressing and/or releasing a button 114).

One exemplary embodiment of each panel controller 116 is shown in FIG. 1C. As shown in FIG. 1C, each panel controller 116 comprises at least one programmable processor 118 on which software or firmware 120 executes. The software 120 comprises program instructions that are stored (or otherwise embodied) on an appropriate non-transitory storage medium or media 122 from which at least a portion of the program instructions are read by the programmable processor 118 for execution thereby. The software 120 is configured to cause the processor 118 to carry out at least some of the operations described here as being performed by that panel controller 116. Although the storage medium 122 is shown in FIG. 1C as being included in the panel controller 116, it is to be understood that remote storage media (for example, storage media that is accessible over a network) and/or removable media can also be used. In the example shown in FIG. 1C, each panel controller 116 also comprises memory 124 for storing the program instructions and any related data during execution of the software 120. Each panel controller 116 can be implemented in other ways.

The sensor 110, LED 112, button 114, and panel controller 116 can be natively integrated into the patching equipment or can be packaged into a retrofit kit that can be installed on already deployed patching equipment.

Each panel controller 116 is communicatively coupled to a rack controller 126 (for example, using a respective serial connection).

One exemplary embodiment of each rack controller 126 is shown in FIG. 1D. As shown in FIG. 1D, each rack controller 126 comprises at least one programmable processor 128 on which software or firmware 130 executes. The software 130 comprises program instructions that are stored (or otherwise embodied) on an appropriate non-transitory storage medium or media 132 from which at least a portion of the program instructions are read by the programmable processor 128 for execution thereby. The software 130 is configured to cause the processor 128 to carry out at least some of the operations described here as being performed by that rack controller 126. Although the storage medium 132 is shown in FIG. 1D as being included in the rack controller 126, it is to be understood that remote storage media (for example, storage media that is accessible over a network) and/or removable media can also be used. In the example shown in FIG. 1D, each rack controller 126 also comprises memory 134 for storing the program instructions and any related data during execution of the software 130.

Each rack controller 126 also includes a display device 136 for displaying information for a user located at the rack and a user-input device 138 for receiving user-input from a user located at the rack. In one example, the display device 136 and the user-input device 138 are implemented together in a liquid crystal display (LCD) touch screen that is used for both displaying information and receiving user input.

Each rack controller 126 also comprises at least one network interface 140 that can be used to communicatively couple that rack controller 136 to a system manager 142 (shown in FIGS. 1A-1B) via a network 144 (such as a local area network or wide area network). For example, in one exemplary implementation, the network interface 140 comprises an Ethernet interface that can be used to communicatively couple the rack controller 126 to an Ethernet network.

Each rack controller 126 can be implemented in other ways.

In the exemplary embodiment shown FIG. 1, the panel controller 116 for each patch panel 102 and 106 is configured to use the sensors 110 in that patch panel 102 or 106 to monitor the state of each port 104 or 108 (that is, whether or not a connector is attached to that port 104 or 108) of that patch panel 102 or 106. This can be done to determine when the state of each port 104 or 108 changes (that is, when a connection or disconnection event occurs at a given port 104 or 108). The panel controller 116 is configured to provide such state and event information to the rack controller 126 assigned to that panel controller 116.

Also, the panel controller 116 for each patch panel 102 and 106 is configured to illuminate or otherwise actuate (for example, by blinking) the respective LED 112 associated with each port 104 or 108 of that patch panel 102 or 106 when instructed to do so by the rack controller 126 assigned to that panel controller 116.

In the exemplary embodiment shown FIG. 1, the panel controller 116 for each patch panel 102 and 106 is also configured to monitor the state of each button 114 of that patch panel 102 or 106. In this example, the state of each button 114 indicates whether or not the button 114 is pressed. This can be done to determine when the state of each button 114 changes (that is, when a button press or release event occurs at a button 114 for a given port 104 or 108). The panel controller 116 is configured to provide such button state and event information to the rack controller 126 assigned to that panel controller 116.

As used herein, the various patch panels 102 or 106 that provide state and event information to a given rack controller 126 are referred to here as being within the "management domain" of that rack controller 126. Each rack controller 126 is configured to receive the state and event information from the patch panels 102 and 106 within that rack controller's management domain. The rack controller 126 uses the state and event information to infer connections that are made, at least in part, using ports 104 or 108 of patch panels 102 or 106 that are within that rack controller's management domain. The software 130 running on the rack controller 126 includes an inference engine that applies various inference rules that are used to infer connections from such state and event information.

The rack controller 126 further comprises a data store 146 that is used to store state and event information that is captured by the rack controller 126 and information about any inferred connections made at least in part within the rack controller's management domain.

The state and event information received by each rack controller 126 and any connections inferred from such information is provided to the system manager 142. The system manager 142 is configured to compile connection information across multiple management domains and to provide an "end-to-end" trace of the connections made across those management domains. The system manager 142 further comprises a data store 148 that is used to store state and event information as well as connection information for the various management domains.

Also, each rack controller 126 is configured to manage a user interface 150 that is displayed on the display device 136 of the rack controller 126 in order to display information for a user and by which the rack controller 126 prompts the user for, and receives user input from, the user via the user-input device 138.

The system 100 can also include or use a portable device 152 such as a general-purpose smartphone, tablet, or personal computer that is configured to execute software (for example, an "AIM app"). The software executing on the portable device 152 can be used to display the user-interface 150 for the rack controller 126 or the system manager 142 on the display of the portable device and to receive user-input from a user via one or more user-input devices of the portable device 152.

In the exemplary embodiment shown in FIG. 1, cables can be used to establish connections between different ports 104 and 108 of the patch panels 102 and 106 and between ports 104 and 108 of the patch panels 102 and 106 and other equipment 154. As used herein, "equipment" 154 refers to any equipment to which a cable can be connected that does not include AIM-related functionality (for example, port sensors 110, LEDs 112, and/or buttons 114).

Both standard point-to-point cable and breakout cables are used in the example shown in FIG. 1. More specifically, in the example shown in FIG. 1, two types of point-to-point cables are used. The first type of point-to-point cable used in the example shown in FIG. 1 is a duplex LC cable 156. Each duplex LC cable 156 has a single duplex LC connector at each end of the cable 156. Each such duplex LC connector comprises two LC connectors, each of which terminating a respective fiber bundled together in the duplex LC cable 156.

The second type of point-to-point cable used in the example shown in FIG. 1 is a WO-to-WO cable 158. Each MPO-to-MPO cable 158 has a single MPO connector at each end of the cable 158. Each such MPO connector terminates multiple fibers (for example, 8 or 12 fibers) that are bundled together in the MPO-to-MPO cable 158.

It is to be understood, however, that other types of point-to-point cables can be used.

In the example shown in FIG. 1, the breakout cables comprise MPO break-out or fan-out cables 160.

Each MPO break-out cable 160 comprises a single MPO connector 162 at a first end of the cable 160. The MPO connector 162 terminates a plurality of individual fibers that are bundled together in the cable 160. In this example, the MPO connector 162 terminates either 8 or 12 that are bundled together in the cable 160.

Each MPO break-out cable 160 also comprises multiple duplex LC connectors 164 at a second end of the cable 160. The second end of each cable 160 is also referred here as the "breakout" end of the cable 160. Each of the multiple, independent duplex LC connectors 164 of each MPO break-out cable 160 can be used to make a patch connection independently of the other multiple, independent duplex LC connectors 164 of the MPO break-out cable 160.

It is to be understood, however, that other types of breakout cables can be used.

It is important to note that although the MPO connectors at each end of a MPO-to-MPO cable 158 terminate multiple fibers (more generally, multiple "lines" of the single cable 158), each MPO connector can only be connected to a single connection point (that is, a single MPO port 104) and the multiple fibers terminated by that MPO connector cannot be separately and independently patched. Thus, a MPO connection made with a MPO connector involves only a single "point" connection, not a "breakout" connection.

Likewise, it is important to note that although the duplex LC connectors at each end of a duplex LC cable 156 terminate two fibers (that is, two "lines" of the cable 156), each duplex LC connector can only be connected to a single connection point (for example, a single duplex LC port 108 of a LC patch panel 106) and the two fibers terminated by that duplex LC connector cannot be separately and independently patched. Thus, a duplex LC connection made with a duplex LC connector involves only a single "point" connection, not a "breakout" connection.

As noted above, inference rules and workflows that are designed for use with standard, point-to-point cables may not work properly when used with cables having other topologies (for example, breakout cables).

Figure 2:
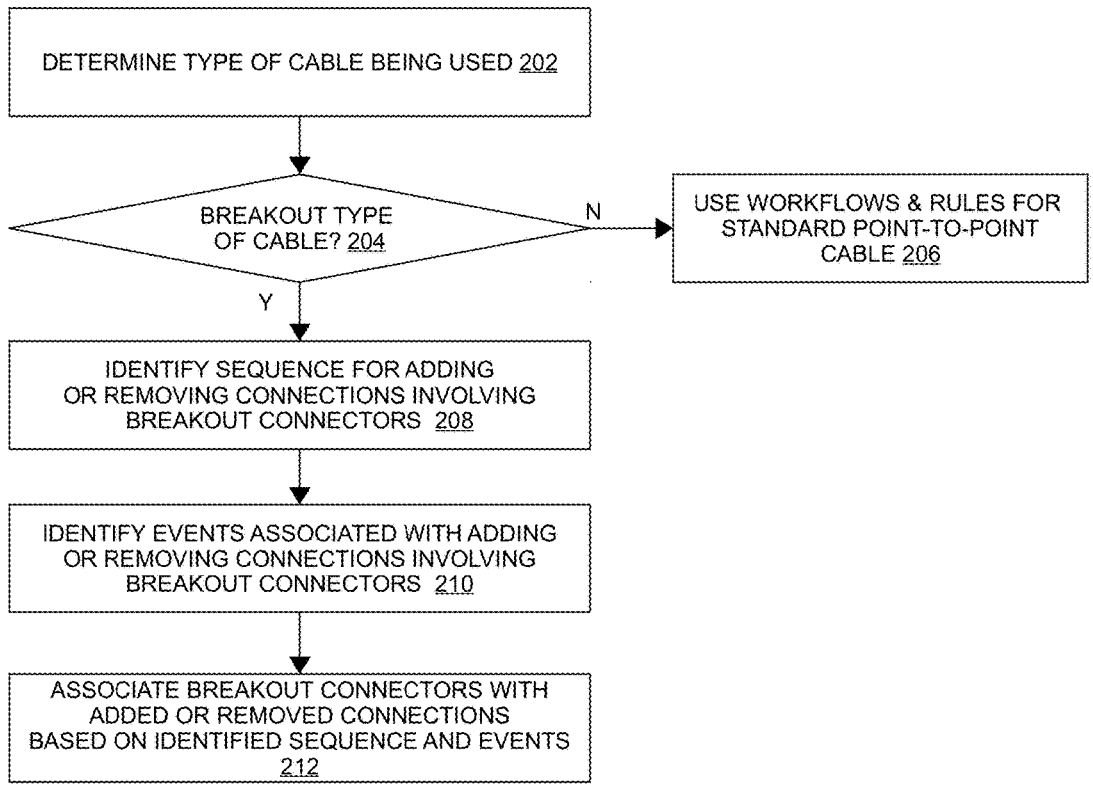
FIG. 2 is a flow-diagram illustrating a method of tracking connections made using a breakout cable.

FIG. 2 is a flow-diagram illustrating a method 200 of tracking connections made using a breakout cable.

The blocks of the flow diagram shown in FIG. 2 have been arranged in a generally sequential manner for ease of explanation; however, it is to be understood that this arrangement is merely exemplary, and it should be recognized that the processing associated with method 200 (and the blocks shown in FIG. 2) can occur in a different order (for example, where at least some of the processing associated with the blocks is performed in parallel and/or in an event-driven manner).

The embodiment of method 200 shown in FIG. 2 is described here as being implemented in the system 100 of FIG. 1, though it is to be understood that other embodiments can be implemented in other ways.

Moreover, the acts associated with method 200 can be implemented using one or more of the controllers of the system 100 of FIG. 1. For example, the acts associated with method 200 can be implemented, at least in part, in software that executes on or in such one or more controllers. It is to be understood, however, that other embodiments can be implemented in other ways.

The processing associated with method 200 is performed when it is possible that a transaction that is handled by the AIM system 100 might involve a breakout cable. For example, this is the case when a transaction involving an MPO port 104 of the MPO patch panel 102 is being handled.

Method 200 comprises determining what type of cable is being used for a current transaction tracked by the AIM system 100 (block 202).

In the example described here in connection with FIG. 1, a user interface 150 is displayed on the display device 136 of the rack controller 126 in order to prompt a user to identify the type of cable that is being used for the current transaction.

For example, the user interface 150 can be configured to display a user-interface element (for example, a drop-down menu, etc.) that a user can interact with in order to identify the type of cable being used for the current transaction. The software 130 executing on the rack controller 126 can be configured to a display a drop-down menu when an MPO connector is connected to an MPO port 104 of an MPO patch panel 102. The drop-down menu is configured to display several types of MPO cables that can be attached to the MPO port 104. In this example, the drop-down menu enables the user to select an WO-to-WO type of cable, a 6 LC connector breakout type of cable, or a 4 LC connector breakout type of cable. The drop-down menu can be configured to display a default selection that is used as the user's selection unless changed by the user (via the user-input device 138).

If the type of cable being used for the current transaction is not a breakout type of cable (checked in block 204), the standard rules and workflows for non-breakout cables are used for the current transaction (block 206).

Method 200 further comprises, if the type of cable being used for the current transaction is a breakout type of cable, identifying a sequence for adding or removing connections involving the breakout connectors of the breakout cable (block 208).

In the example described here in connection with FIG. 1, the sequence is identified using a user interface 150 displayed on the display device 136 for the rack controller 126 and for which user input is received via the user-input device 138.

In one example, the sequence is identified by successively identifying each breakout connector that will be used for adding or removing a connection. That is, for the current transaction, before adding or removing a connection involving one of the breakout connectors of the breakout cable, the breakout connector that will be involved in the adding or removing of that connection is identified. In this way, the sequence of breakout connectors used in adding or removing connections using the breakout cable is identified for the current transaction.

The sequence for adding or removing connections involving the breakout connectors of the breakout cable can be identified in other ways.

Method 200 further comprises identifying events associated with adding or removing connections involving the breakout connectors of the breakout cable for the current transaction (block 210).

In this example described here in connection with FIG. 1, any events associated with adding or removing connections involving the breakout connectors of the breakout cable can be identified using the sensors 110 associated with each port 104 and 108 of the patching panels 102 and 106. As noted above, each sensor 110 is configured to determine whether or not a connector is connected to the associated port 104 or 108. By repeatedly checking the state of the sensors 110, changes in the state of a port 104 or 108 can be detected (that is, when a connector is connected to a port 104 or 108 or when a connector that was previously connected to a port 104 or 108 is removed from the port 104 or 108). Sensor information can be received by the relevant controller and used to identify events associated with adding or removing connections involving the breakout connectors of the breakout cable.

For equipment 154 that does not include an AIM-related sensor 110, any events associated with adding or removing connections involving the breakout connectors to or from such equipment 154 can be identified by receiving a user input indicating that a connection has been added or removed from the equipment 154.

This can involve having the user press a button 114 associated with a port 104 or 108 to which a connector at the non-breakout end of the breakout cable is connected or from which the connector at the non-breakout end of the break cable was recently removed. In this example, where the MPO breakout cable 160 shown in FIG. 1B is used, the user can press a button 114 associated with the MPO port 104 to which the MPO connector 162 at the non-breakout end of the MPO breakout cable 160 is connected to or removed from.

Also, the user interface 150 displayed on the display device 136 of the rack controller 126 can be used to receive a user input that indicates that a breakout connector of the breakout cable has been connected to or removed from equipment 154. For example, a button or other user-interface element can be displayed by the user interface 150 and is configured so that, when a user clicks on (or otherwise actuates) the button, it indicates that a breakout connector of the breakout cable has been connected to or removed from equipment 154.

Events associated with adding or removing connections involving the breakout connectors of the breakout cable can be identified in other ways.

Method 200 further comprises associating the breakout connectors of the breakout cable with added or removed connections for the current transaction based on the identified sequence and the identified events (block 212).

For example, the first breakout connector of the breakout cable that is identified in the sequence is associated with the first event, the second breakout connector of the breakout cable that is identified in the sequence is associated with the second event, and so on. Then, these breakout connector associations can be associated with the connector at the other end of the breakout cable. For example, where the breakout cable is an MPO breakout cable 160 of the type shown in FIG. 1 where there is a MPO connector 162 at the non-breakout end of the cable 160, the MPO port 104 to which the MPO connector 162 is connected can be considered to be connected to each of the LC ports 108 to which an LC connector 164 is connected. Similar logic can be used for disconnections or changes of connections.

FIGS. 3A-3E illustrate one example of adding a connection involving a breakout cable. This example is described here as being implemented in the system 100 of FIG. 1, though it is to be understood that other embodiments can be implemented in other ways.

In this example, an MPO breakout cable 160 is added to the system 100 of FIG. 1. First, the MPO connector 162 attached to the MPO break-out cable 160 is connected to an MPO port 104 of the MPO panel 102. When this happens, the sensor 110 associated with that port 104 detects the connection and informs the panel controller 116 about that event. The patch panel controller 116 in turn informs the rack controller 126.

In response, the rack controller 126 uses the user interface 150 of the rack controller 126 to display an "ADD CONNECTION" screen 390 that is used to display information about the MPO port 104 and MPO panel 102.

Figure 3A:
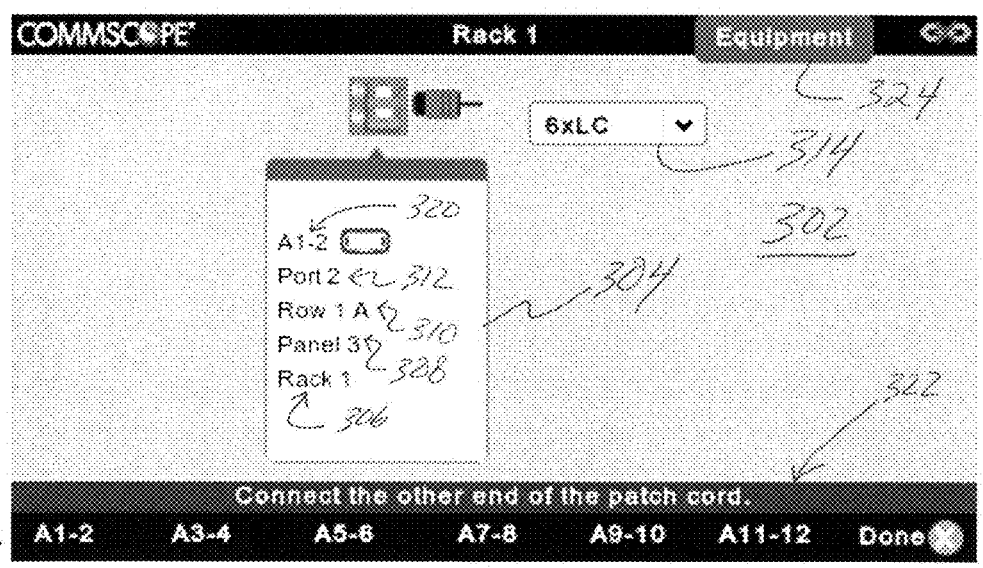
FIGS. 3A-3E illustrate one example of adding a connection involving a breakout cable.

In this example, as shown in FIG. 3A, the ADD CONNECTION screen 390 comprises a main part 302 that includes an information box 304 that displays a rack identifier 306, panel identifier 308, row identifier 310, and port identifier 312 for the associated rack, patch panel 102, row, and port 104, respectively).

Also, the ADD CONNECTION screen 390 prompts the user to identify the type of cable that has been connected to the port 102. In this example, a drop down menu 314 is displayed. The user is able to click on the drop down menu 314 in order to select the type of cable that was connected to the MPO port 104.

In this example, the drop down menu 314 includes three types of cables (shown in FIG. 3B)—an MPO-to-MPO type of cable (labelled "MPO" in the menu 314), a type of MPO breakout cable having 6 duplex LC breakout connectors (labelled "6×LC" in the menu 314), and a type of MPO breakout cable having 4 duplex LC breakout connectors (labelled "4×LC" in the menu 314).

In general, if a breakout type of cable was connected to the MPO port 104 and the user uses the drop down menu 314 to select a breakout type of cables, the rack controller 126 uses the user interface 150 to identify a sequence for adding connections involving the breakout connectors of the breakout cable.

Figure 3B:
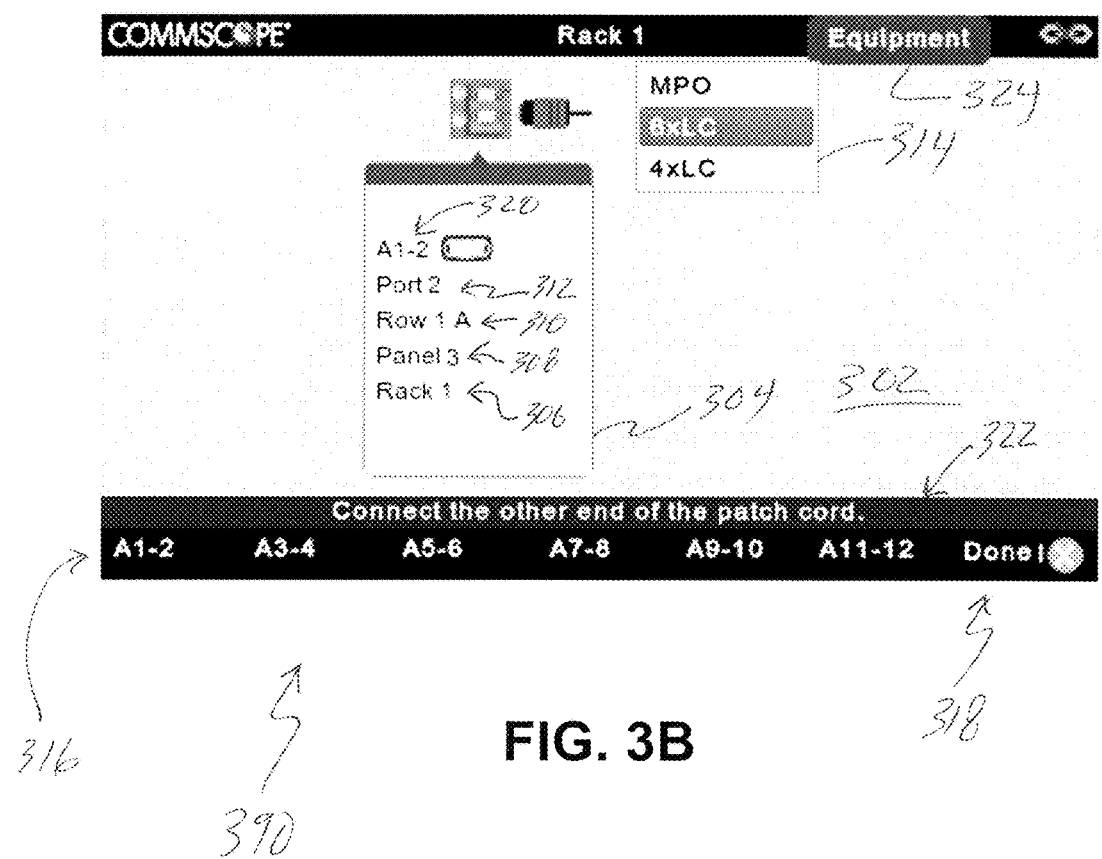

FIGS. 3A and 3B show the drop down menu 314 with a default selection of 6×LC, which corresponds to the 6×LC type of MPO breakout cable. The bottom of the user interface includes a button 316 for each of the connectors at the other end of the cable connected to the MPO port 104.

As shown in FIGS. 3A and 3B, when the 6×LC type of MPO breakout cable is selected in the drop down menu 314, buttons 316 for each of the six duplex LC breakout connectors at the breakout end of the MPO cable are displayed (labelled "A1-2", "A3-4", "A5-6", "A7-8", "A9-10", and "A11-12" in the example shown in FIGS. 3A and 3B). The bottom of the display also includes a "DONE" button 318 that the user can click on in order to indicate that the current transaction is complete.

Also, the information box 304 in the main part 302 of the ADD CONNECTION screen 390 identifies the "selected" breakout connector 320 (the first duplex connector labelled A1-2 in the example shown in FIGS. 3A and 3B).

In this example, a MPO breakout cable having 4 duplex LC connectors was connected to the MPO port 104 of an MPO panel 102. As a result, as shown in FIG. 3C, the user selects the "4×LC" selection in the drop down menu 314.

Figure 3C:
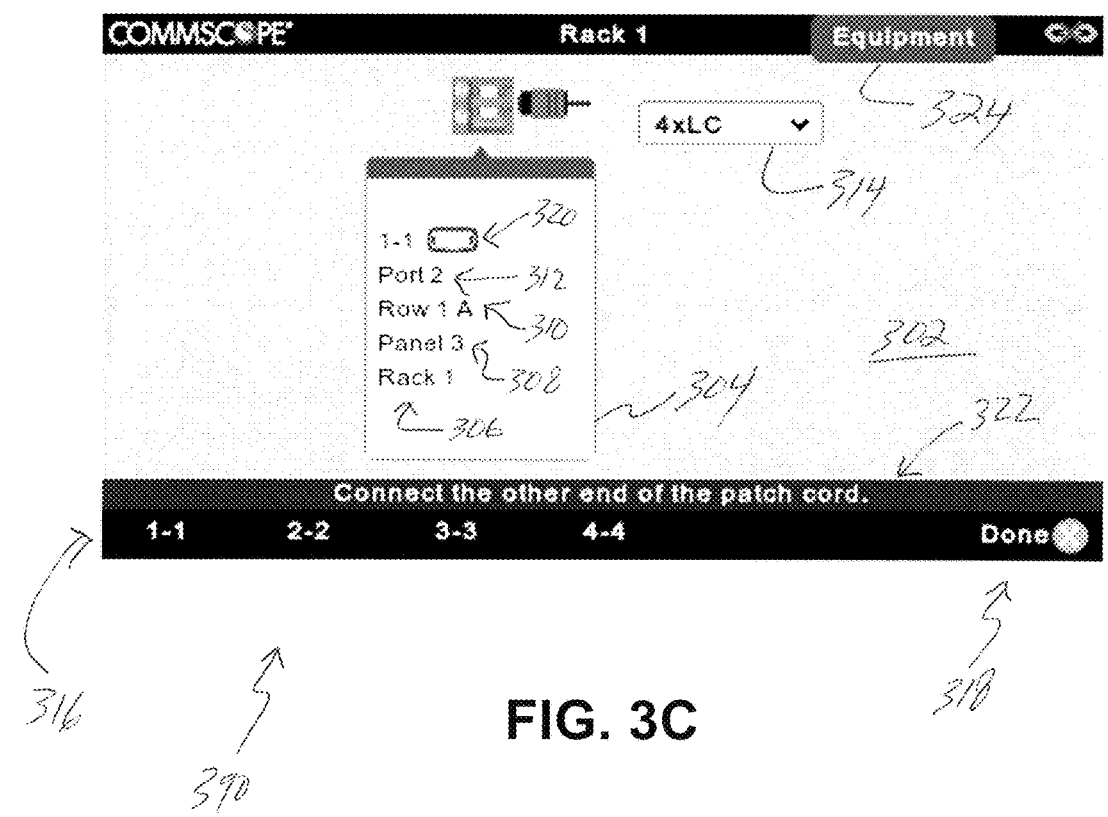

As shown in FIG. 3C, the buttons 316 are updated to reflect the type of cable selected (the 4×LC type of MPO breakout cable). That is, four buttons 316 are displayed, one for each of the 4 duplex LC connectors of the breakout cable (labelled "1-1", "2-2", "3-3", and "4-4" in this example). Also, the information box 304 in the main part 302 of the ADD CONNECTION screen 390 is updated to identify the selected breakout connector 320 (the first duplex LC breakout connector "1-1" in the example shown in FIG. 3C).

The ADD CONNECTION screen 390 also includes a message line 322, which is used to display a messages to the user. In FIG. 3C, the message line 322 displays a message prompting the user to make a connection using the selected breakout LC connector of the MPO breakout cable.

In this example, the user connects the selected (first) duplex LC breakout connector 1-1 to a port 108 of an LC panel 106. When this happens, the sensor 110 associated with that port 108 detects the connection and informs the associated panel controller 116 about that event. The patch panel controller 116 in turn informs the rack controller 126.

Figure 3D:
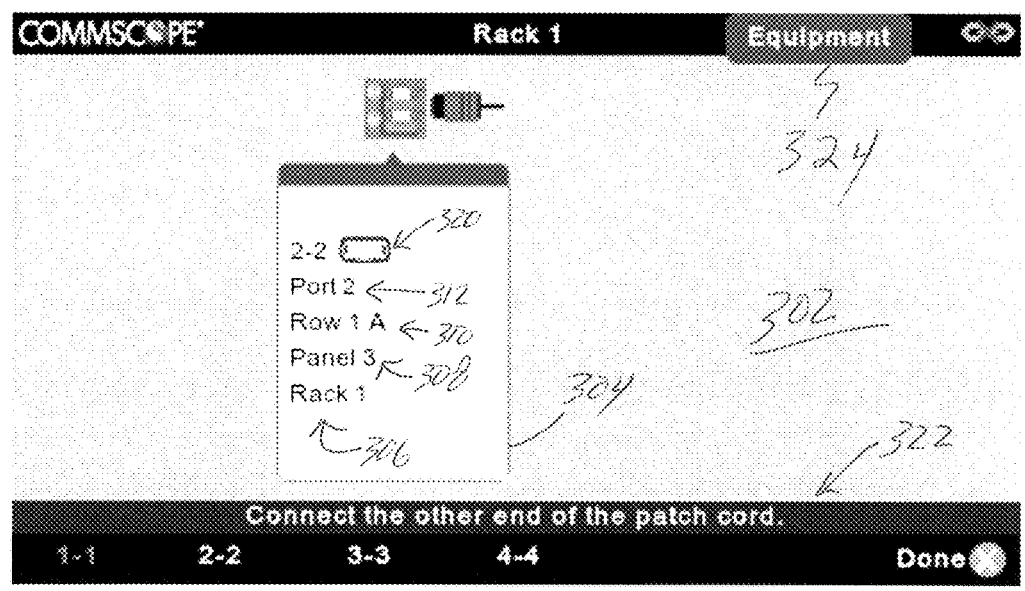

After the first duplex LC breakout connector 1-1 is connected to the port 108 of the LC panel 106, the information box 304 in the main part 302 of the ADD CONNECTION screen 390 is updated to identify the second duplex LC breakout connector 2-2 as the selected breakout connector 320 as shown in FIG. 3D. The buttons 316 at the bottom of the ADD CONNECTION screen 390 are also updated to indicate that the first duplex LC breakout connector 1-1 has been connected (indicated by greying out the button 316 associated with the first duplex LC breakout connector 1-1).

In this example, the user connects the second duplex LC breakout connector 2-2 to equipment 154. Because the equipment 154 does not include AIM-related functionality for automatically detecting and reporting such a connection to the rack controller 126, the user must press an equipment button 324 that is a part of the ADD CONNECTION screen 390. In this way, the rack controller 126 knows that the second duplex LC breakout connector 2-2 of the breakout cable is associated with the equipment connection event generated by the user pressing the equipment button 324.

This general process is repeated for each of the remaining duplex LC breakout connectors.

Figure 3E:
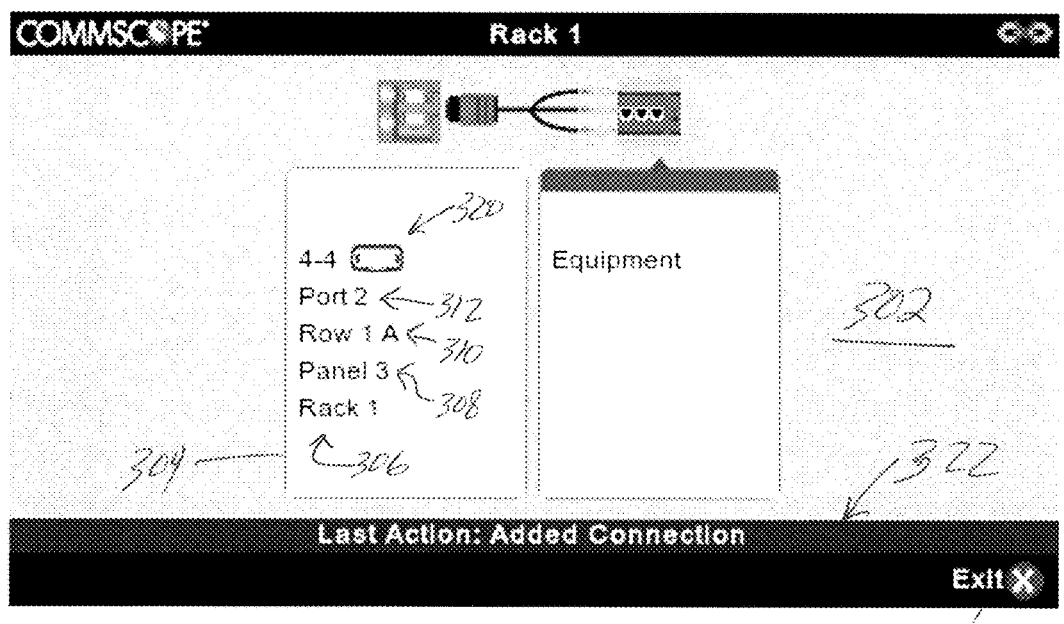

After connections have been made using all of the duplex LC breakout connectors, as shown in FIG. 3E, the message line 322 of the ADD CONNECTION screen 390 is updated to indicate that fact, and the main part 302 of the ADD CONNECTION screen 390 shows the fourth duplex LC breakout connector 4-4 being connected to equipment 154.

The ADD CONNECTION screen 390 is also updated to include an "EXIT" button 330 that the user can click on in order to indicate the user is done with the current transaction.

Figure 4A:
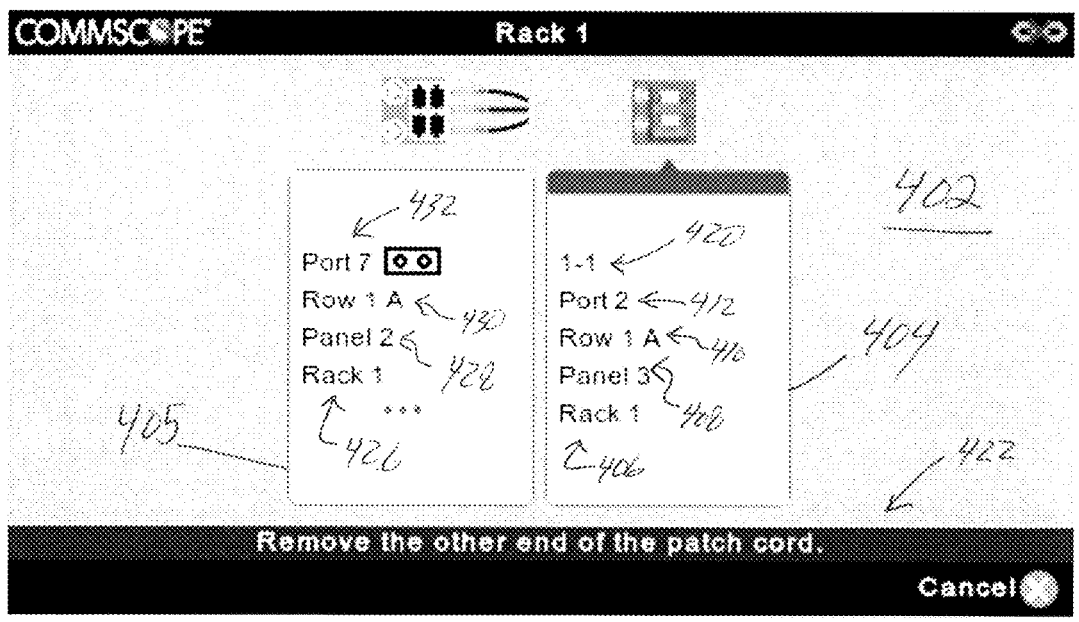
FIGS. 4A-4C illustrate one example of removing a connection involving a breakout cable.
Figure 4B:
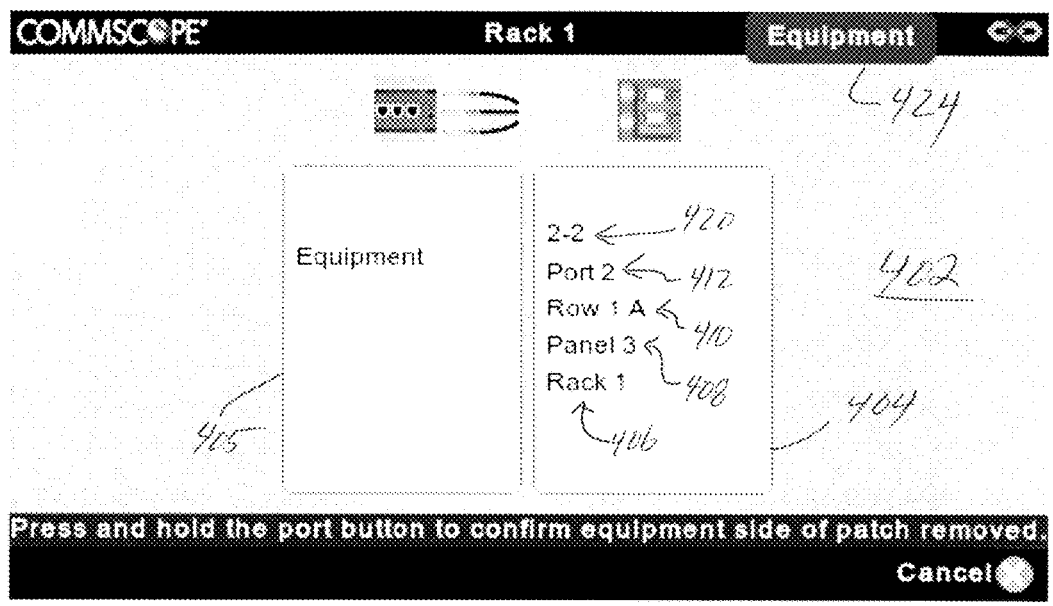
Figure 4C:
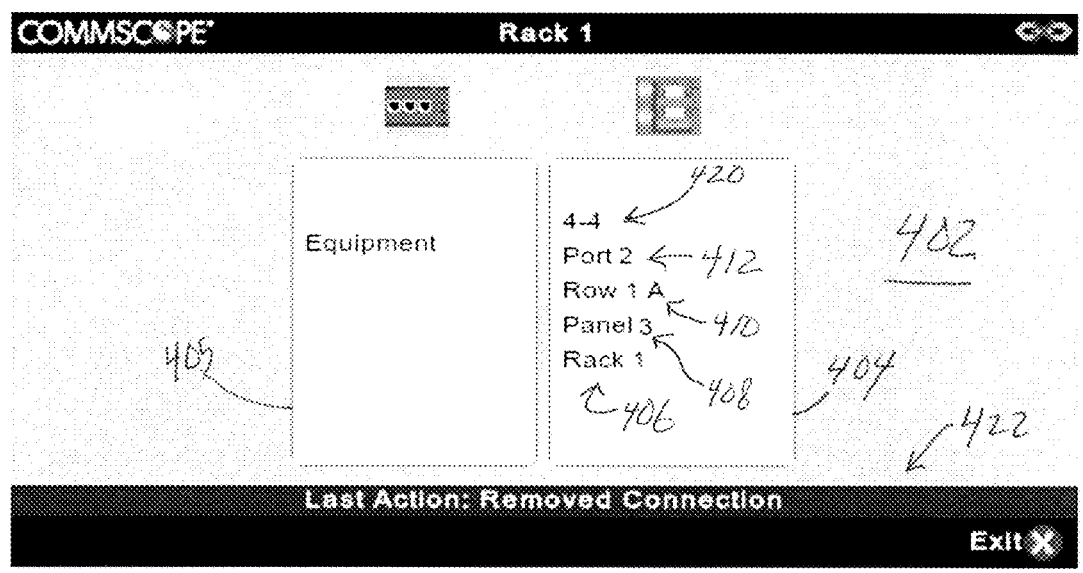

FIGS. 4A-4C illustrate one example of removing a connection involving a breakout cable. This example is described here as being implemented in the system 100 of FIG. 1, though it is to be understood that other embodiments can be implemented in other ways.

In this example, the MPO breakout cable 162 described above in connection with the example shown in FIGS. 3A-3E is removed.

First, the MPO connector 160 attached to the MPO breakout cable 160 that was previously attached to an MPO port 104 of a MPO panel 102 is removed. When this happens, the sensor 110 associated with that port 104 detects the removal and informs the panel controller 116 about that event. The patch panel controller 116 in turn informs the rack controller 126.

In response, the rack controller 126 uses the user interface 150 to identify a sequence for removing connections involving the breakout connectors of the breakout cable. Specifically, the rack controller 126 uses the user interface 150 of the rack controller 126 to display a "REMOVE CONNECTION" screen 490 that is used to display information about the MPO port 104 and MPO panel 102.

As shown in FIG. 4A, the main part 402 of the REMOVE CONNECTION screen 490 includes two information boxes 404 and 405. The first information box 404 displays information about the device connected to the MPO connector of the MPO breakout cable (that is, the MPO panel 102). The first information box 404 displays a rack identifier 406, panel identifier 408, row identifier 410, and port identifier 412 for the associated rack, patch panel 102, row, and port 104, respectively). The first information box 404 in the main part 402 of the REMOVE CONNECTION screen 490 also identifies the "selected" breakout connector 420 (the first duplex connector labelled 1-1 in the example shown in FIG. 4A).

The second information box 405 displays information about the device connected to the first (selected) duplex LC breakout connector of the MPO breakout cable (that is, an LC panel 106). The second information box 405 displays a rack identifier 426, panel identifier 428, row identifier 430, and port identifier 432 for the associated rack, patch panel 106, row, and port 108, respectively).

The REMOVE CONNECTION screen 490 also includes a message line 422, which is used to display a messages for the user. In FIG. 4A, the message line 422 displays a message prompting the user to disconnect the first (selected) duplex LC breakout connector 1-1 from the port identified in the second information box 504.

The REMOVE CONNECTION screen 490 also includes a "CANCEL" button 419 that the user can click on in order to cancel the current transaction.

In this example, the user disconnects the selected (first) duplex LC breakout connector 1-1 from the identified port 108 of the identified LC panel 106. When this happens, the sensor 110 associated with that port 108 detects the disconnection and informs the associated panel controller 116 about that event. The patch panel controller 116 in turn informs the rack controller 126.

After the (selected) first duplex LC breakout connector 1-1 is disconnected from the port 108 of the LC panel 106, the first information box 404 in the main part 402 of the REMOVE CONNECTION screen 490 is updated to identify the second duplex LC breakout connector 2-2 as the selected breakout connector 420 as shown in FIG. 4B.

Also, the second information box 405 is updated to display information about the device connected to the second (selected) duplex LC breakout connector 2-2 of the MPO breakout cable. In this example, the second information box 405 indicates that the second (selected) duplex LC breakout connector 2-2 is connected to equipment 154.

Because the equipment 154 does not include AIM-related functionality for automatically detecting and reporting a removal of a connector to the rack controller 126, the user can press and hold the button 114 associated with the MPO port 104 identified in the first information box 404 (that is, the MPO port 104 that the MPO connector 162 attached the MPO breakout cable was removed from). In FIG. 4B, the message line 422 is updated to display a message prompting the user to press and hold the button 114 associated with the MPO port 104 identified in the first information box 404 after the second duplex LC breakout connector is removed from equipment 154. Instead, the user can press the equipment button 424 displayed on the REMOVE CONNECTION screen 490 after the second duplex LC breakout connector is removed from equipment 154. By pressing and holding the button 114 or by pressing the equipment button 424, the rack controller 126 knows that the second duplex LC breakout connector 2-2 of the breakout cable is associated with the equipment connection event generated by the user pressing the port button 114 or the equipment button 324 in the REMOVE CONNECTION screen 490.

This general process is repeated for each of the remaining duplex LC breakout connectors.

After the connections for all of the duplex LC breakout connectors have been removed, the message line 422 of the REMOVE CONNECTION screen 490 is updated to indicate that fact as shown in FIG. 4C, and the main part 402 of the REMOVE CONNECTION screen 490 indicates that the connection of the fourth duplex LC breakout connector 4-4 to the equipment 154 has been removed. The REMOVE CONNECTION screen 490 is also updated to include an "EXIT" button 430 that the user can click on in order to indicate the user is done with the current transaction.

Figure 5A:
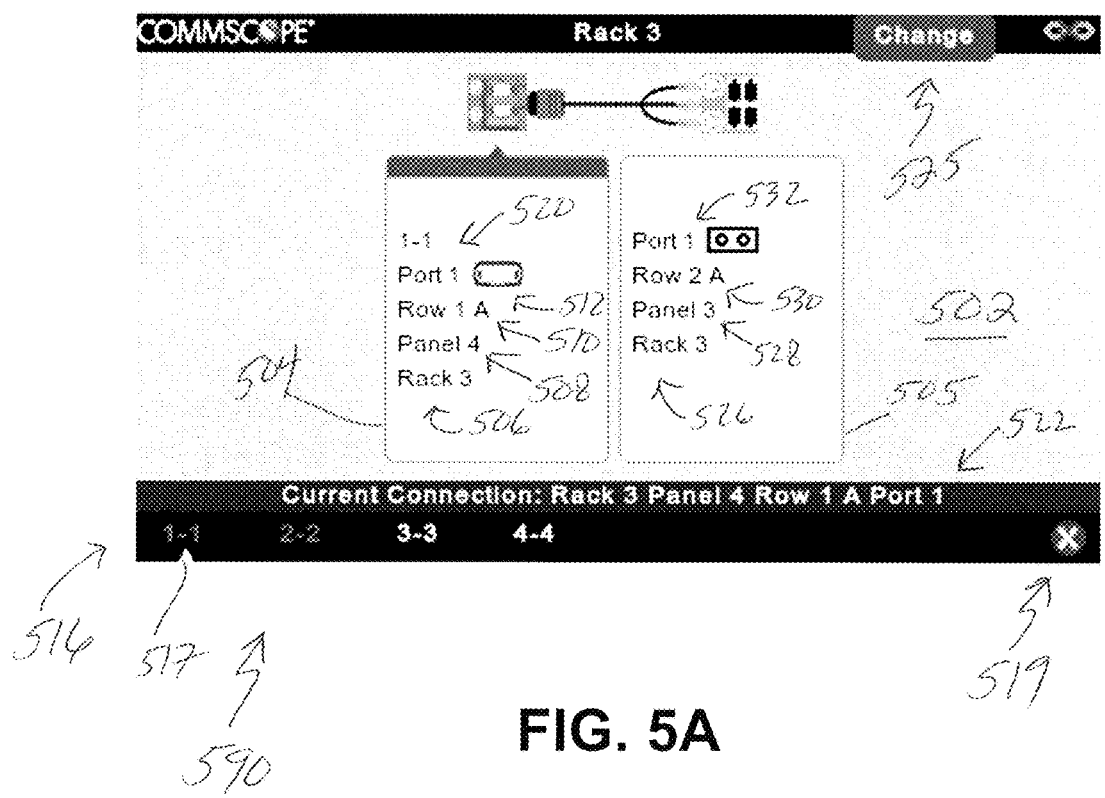
FIGS. 5A-5C illustrate one example of tracing a connection involving a breakout cable.
Figure 5B:
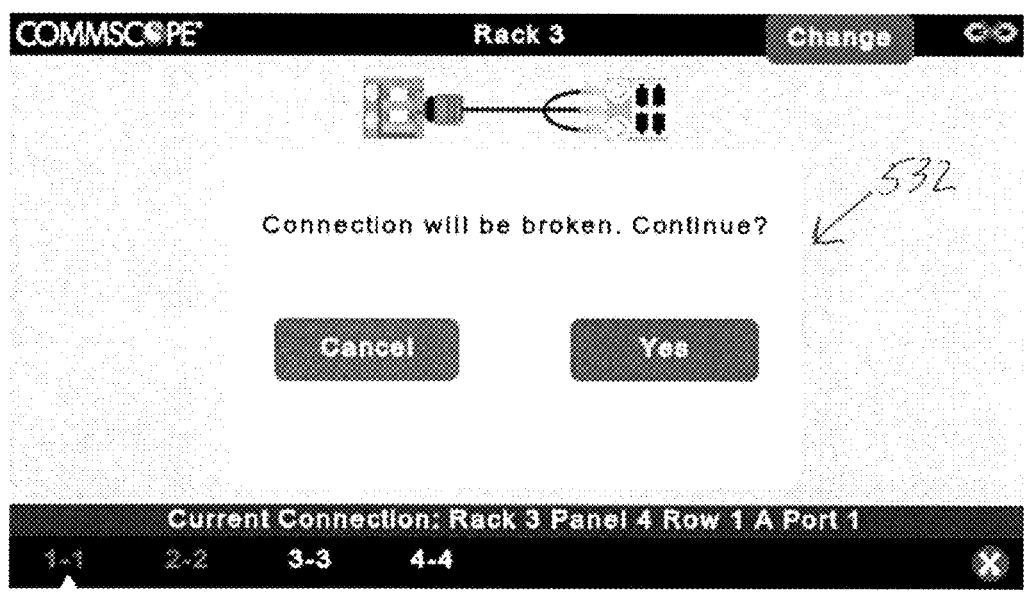
Figure 5C:
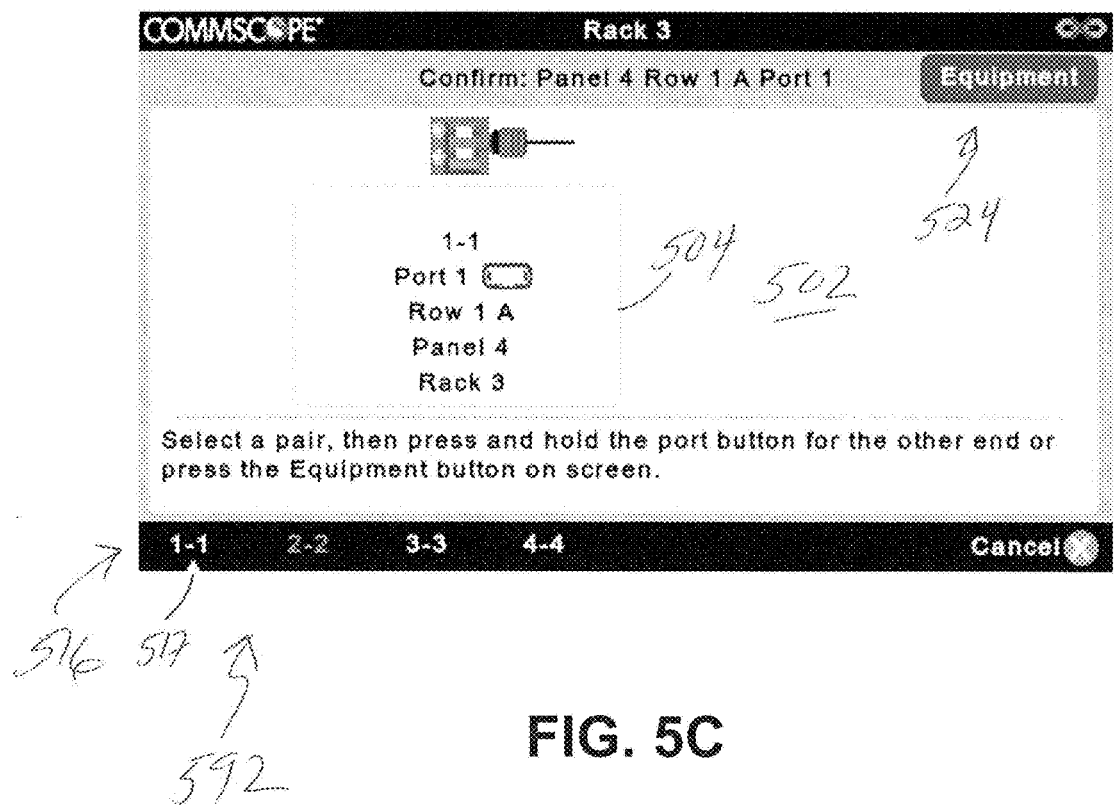

FIGS. 5A-5C illustrate one example of tracing a connection involving a breakout cable. This example is described here as being implemented in the system 100 of FIG. 1, though it is to be understood that other embodiments can be implemented in other ways.

In this example, connections involving the MPO breakout cable 160 described above in connection with the example shown in FIGS. 3A-3E are traced.

First, the user presses the button 114 associated with the MPO port 104 to which the MPO connector 162 of the MPO breakout cable 160 is connected. When this happens, the panel controller 116 detects that button press event and informs the rack controller 126 of that fact. In response, the rack controller 126 uses the user interface 150 to identify a sequence for tracing and/or changing connections involving the breakout connectors of the breakout cable. Specifically, the rack controller 126 uses the user interface 150 of the rack controller 126 to display a "TRACE CONNECTION" screen 590 that is used to display information about the MPO port 104 and MPO panel 102.

As shown in FIG. 5A, the main part 502 of the TRACE CONNECTION screen 590 includes two information boxes 504 and 505.

The first information box 504 displays information about the device connected to the MPO connector of the MPO breakout cable (that is, the MPO panel 102). The first information box 504 displays a rack identifier 506, panel identifier 508, row identifier 510, and port identifier 512 for the associated rack, patch panel 102, row, and port 104, respectively). The first information box 504 in the main part 502 of the TRACE CONNECTION screen 590 also identifies the "selected" breakout connector 520 (the first duplex connector labelled 1-1 in the example shown in FIG. 5A).

The second information box 505 displays information about the device connected to the first (selected) duplex LC breakout connector of the MPO breakout cable (that is, an LC panel 106). The second information box 505 displays a rack identifier 526, panel identifier 528, row identifier 530, and port identifier 532 for the associated rack, patch panel 106, row, and port 108, respectively).

The TRACE CONNECTION screen 590 also includes a message line 522, which is used to display a messages to the user. In FIG. 5A, the message line 522 displays a message identifying the device that the first (selected) duplex LC breakout connector 1-1 is connected to (which is also identified in the second information box 505).

The bottom of the TRACE CONNECTION screen 590 includes a button 516 for each of the breakout connectors of the breakout cable connected to the MPO port 104. In this example, the button 516 that corresponds to the selected duplex LC breakout connector is highlighted (by using a pointer 517 in the example shown in FIG. 5A). The user can trace a different breakout connector of the same breakout cable by clicking on the corresponding button 516.

The TRACE CONNECTION screen 590 also includes a "CANCEL" button 519 that the user can click on in order to cancel the current transaction.

From the TRACE CONNECTION screen 590, the user can also change a connection made using a breakout connector. The user can click on a "CHANGE" button 525 included in the TRACE CONNECTION screen 590 in order to indicate that the user wishes to change the connection that is made using the selected breakout connector. If the user clicks on the CHANGE button 525, a pop-up window 532 is displayed that asks the user to confirm that the user wishes to break the connection that is currently made using the selected breakout connector (as shown in FIG. 5B). If the user confirms this (for example, by clicking on a "YES" button displayed in the pop-up window 532), the user interface 150 displays a "CONFIRMATION" screen 592 (as shown in FIG. 5C).

As shown in FIG. 5C, the CONFIRMATION screen 592 includes an information box 504 that identifies the selected breakout connector.

The bottom of the CONFIRMATION screen 592 includes a button 516 for each of the breakout connectors of the breakout cable connected to the MPO port 104. In this example, the buttons 516 that corresponds to the selected duplex LC breakout connector is highlighted (by using a pointer 517 in the example shown in FIG. 5C). The user can select a different breakout connector of the same breakout cable by clicking on the corresponding button 516.

The user then removes the selected breakout connector from the port 108 or equipment 154 that it is currently connected to and connects the selected breakout connector to a different port 108 or equipment 154. If the selected breakout connector is connected to an LC port 108 of an LC panel 106, the associated sensor 110 will detect that connection and will inform the associated panel controller 116 about that event. The patch panel controller 116 in turn informs the rack controller 126.

If the selected breakout connector is connected to equipment 154 that does not include AIM-related functionality for automatically detecting and reporting such a connection to the rack controller 126, the user can press and hold the button 114 associated with the MPO port 104 identified in the first information box 504 (that is, the MPO port 104 that the MPO connector 162 attached the MPO breakout cable was removed from). In FIG. 5C, the message line 522 is updated to display a message prompting the user to press and hold the button 114 associated with the MPO port 104 identified in the first information box 504. Instead, the user can press the equipment button 524 displayed on the CONFIRMATION screen 592 after the user has removed the second duplex LC breakout connector from equipment 154. By pressing and holding the button 114 or by pressing the equipment button 524, the rack controller 126 knows that the selected duplex LC breakout connector of the breakout cable is associated with the connection event generated by the user pressing the button 144 or the equipment button 524.

After this, the TRACE CONNECTION screen 590 is displayed and the user can then select a different breakout connector to trace and/or change by clicking on the appropriate button 516 at the bottom of the TRACE CONNECTION screen 590.

Figure 6A:
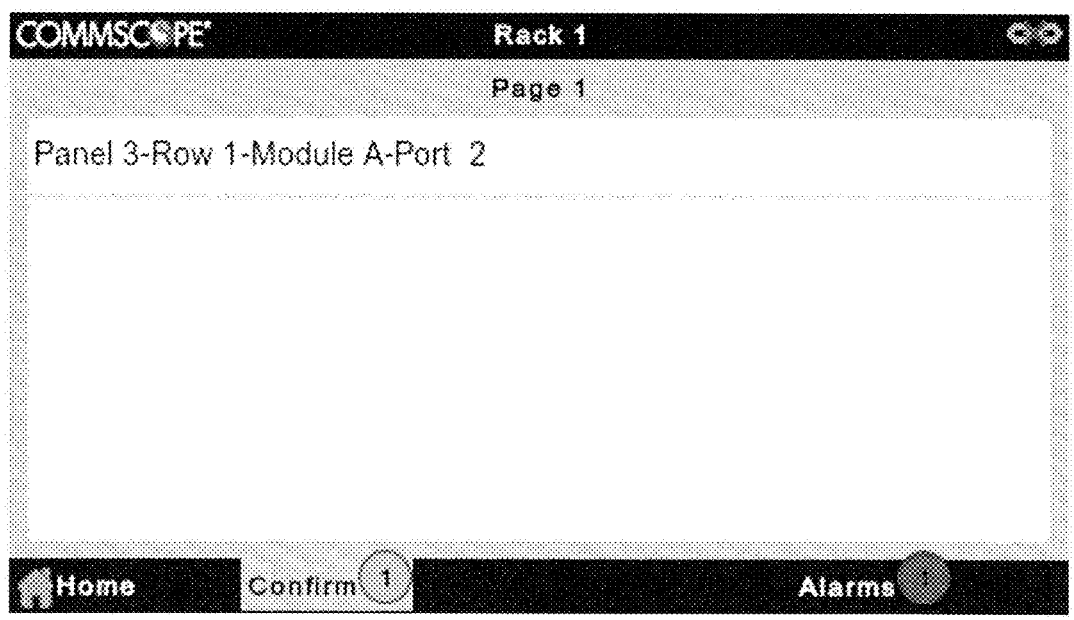
FIGS. 6A-6B illustrate one example of confirming a connection involving a breakout cable.
Figure 6B:
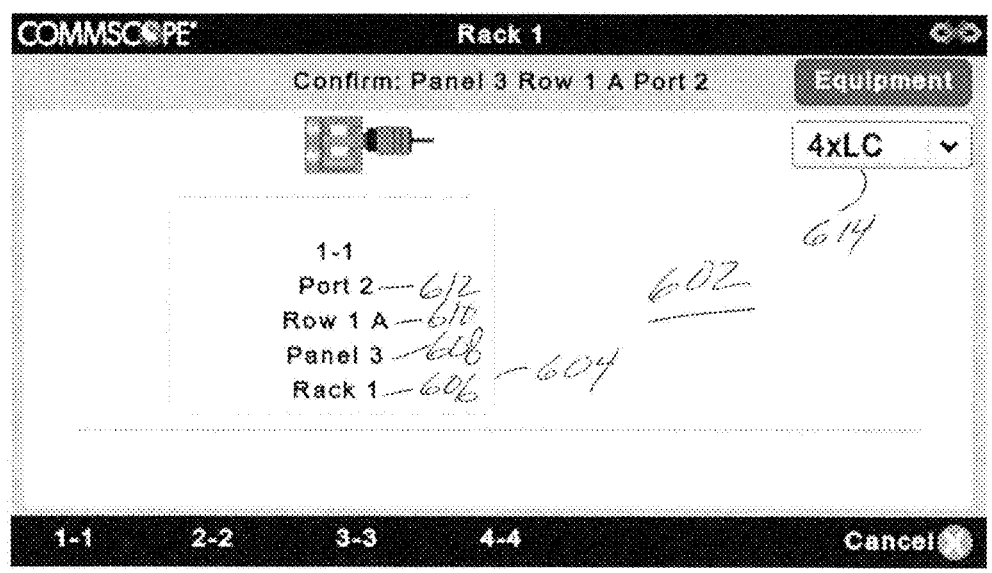

FIGS. 6A-6B illustrate one example of confirming a connection involving a breakout cable. This example is described here as being implemented in the system 100 of FIG. 1, though it is to be understood that other embodiments can be implemented in other ways.

In this example, a connector has been connected to the MPO port 104 and the rack controller 126 has been informed of that fact. However, for some reason in this example the rack controller 126 has not been able to determine the cable's type and/or what the other end of that cable is connected to.

In response, the rack controller 126 uses the user interface 150 of the rack controller 126 to display a "CONFIRMATION" screen 690 that indicates that there is a port 104 that needs a confirmation to be performed. As shown in FIG. 6A, the CONFIRMATION screen 690 identifies the relevant port and displays a confirm button 665 that indicates a confirmation needs to be performed for the indicated port.

If the user clicks on the confirm button 665, the CONFIRMATION screen 690 is updated to display a main part 602 that includes an information box 604 that displays a rack identifier 606, panel identifier 608, row identifier 610, and port identifier 612 for the associated rack, patch panel 102, row, and port 104, respectively).

Also, the CONFIRMATION screen 690 prompts the user to identify the type of cable that has been connected to the port 104. In this example, a drop down menu 614 is displayed. The user is able to click on the drop down menu 614 in order to select the type of cable that was connected to the MPO port 104.

In general, if a breakout type of cable was connected to the MPO port 104 and the user uses the drop down menu 614 to select a breakout type of cable, the rack controller 126 uses the user interface 150 to identify a sequence for adding connections involving the breakout connectors of the breakout cable.

In this example, a MPO breakout cable having 4 duplex LC connectors was connected to the MPO port 104 of an MPO panel 102. As a result, as shown in FIG. 6B, the user selects the "4×LC" selection in the drop down menu 614.

Also, the bottom of the CONFIRMATION screen 690 includes a button 616 for each of the breakout connectors of the breakout cable connected to the MPO port 104. The user can confirm a particular breakout connector by clicking on the corresponding button 616. When the user clicks on such a button 616, the user is then prompted to identify the other end of the connection as described above in connection with FIG. 5C. This can be done for each of the breakout connectors.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

Example Embodiments

Example 1 includes to a method of tracking, using an automated infrastructure management (AIM) system, connections made using a breakout cable comprising a plurality of breakout connectors at a breakout end of the breakout cable, the method comprising: identifying a sequence for adding or removing connections involving the breakout connectors of the breakout cable; identifying events associated with adding or removing connections involving the breakout connectors of the breakout cable; and associating the breakout connectors of the breakout cable with added or removed connections based on the identified sequence and the identified events.

Example 2 includes the method of Example 1, further comprising determining that a breakout type of cable is being used for the added or removed connections.

Example 3 includes the method of Example 2, wherein determining that the breakout type of cable is being used for the added or removed connections comprises: receiving, via at least one controller of the AIM system, a user input indicating that the breakout type of cable is being used for the added or removed connections.

Example 4 includes any of the methods of Examples 1-3, wherein the method is performed by at least one controller included in the AIM system.

Example 5 includes the method of Example 4, wherein the at least one controller comprises at least one of: a panel controller, a rack controller, a system manager executing on a computer, and an application executing a portable computing device.

Example 6 includes any of the methods of Examples 1-5, wherein identifying the sequence for adding or removing connections involving the breakout connectors of the breakout cable comprises: before adding or removing a connection involving one of the breakout connectors of the breakout cable, identifying the breakout connector that will be involved in the adding or removing of that connection.

Example 7 includes any of the methods of Examples 1-6, wherein identifying events associated with adding or removing connections involving the breakout connectors of the breakout cable comprises at least one of: receiving data derived from sensing, via a sensor associated with a port, that a connection has been added or removed from the port; and receiving a user input indicating that a connection has been added or removed from a port.

Example 8 includes the method of Example 7, wherein receiving the user input indicating that the connection has been added or removed from the port comprises at least one of: receiving data indicating that a button has been pressed, the button associated with a port to which a connector at a second end of the breakout cable is connected or from which the connector at the second end of the break cable was recently removed; and receiving a user input via at least one controller of the AIM system.

Example 9 includes any of the methods of Examples 1-8, wherein the breakout cable comprises a non-breakout connector at a second end of the breakout cable.

Example 10 includes any of the methods of Examples 1-9, wherein the breakout cable comprises at least one of a fiber breakout cable and a copper break out cable.

Example 11 includes the method of Example 10, wherein the fiber breakout cable comprises a multi-fiber push on (MPO) breakout cable.

Example 12 includes a system comprising: a plurality of items of patching equipment, each of which comprises a plurality of ports; and at least one controller comprising a display device and a user-input device; wherein the controller is configured to track connections made using a breakout cable comprising a plurality of breakout connectors at a breakout end of the breakout cable by: identifying a sequence for adding or removing connections involving the breakout connectors of the breakout cable; identifying events associated with adding or removing connections involving the breakout connectors of the breakout cable; and associating the breakout connectors of the breakout cable with added or removed connections based on the identified sequence and the identified events.

Example 13 includes the system of Example 12, wherein the controller is further configured to determine that a breakout type of cable is being used for the added or removed connections.

Example 14 includes the system of Example 13, wherein the controller is configured to determine that the breakout type of cable is being used for the added or removed connections by receiving, via the user-input device, a user input indicating that the breakout type of cable is being used for the added or removed connections.

Example 15 includes any of the systems of Examples 12-14, wherein the at least one controller comprises at least one of: a panel controller, a rack controller, a system manager executing on a computer, and an application executing a portable computing device.

Example 16 includes any of the systems of Examples 12-15, wherein the controller is configured to identify the sequence for adding or removing connections involving the breakout connectors of the breakout cable by: before adding or removing a connection involving one of the breakout connectors of the breakout cable, identifying the breakout connector that will be involved in the adding or removing of that connection.

Example 17 includes any of the systems of Examples 12-16, wherein the controller is configured to identify events associated with adding or removing connections involving the breakout connectors of the breakout cable by doing at least one of: receiving data derived from sensing, via a sensor associated with a port of at least one item of patching equipment, that a connection has been added or removed from the port; and receiving a user input indicating that a connection has been added or removed from a port.

Example 18 includes the system of Example 17, wherein the controller is configured to receive the user input indicating that the connection has been added or removed from the port by at least one of: receiving data indicating that a button has been pressed, the button associated with a port to which a connector at a second end of the breakout cable is connected or from which the connector at the second end of the break cable was recently removed; and receiving a user input via the user-input device.

Example 19 includes any of the systems of Examples 12-18, wherein the breakout cable comprises a non-breakout connector at a second end of the breakout cable.

Example 20 includes any of the systems of Examples 12-19, wherein the breakout cable comprises at least one of a fiber breakout cable and a copper break out cable.

Example 21 includes the system of Example 20, wherein the fiber breakout cable comprises a multi-fiber push on (MPO) breakout cable.

What is claimed is:

1. A method of tracking, using an automated infrastructure management (AIM) system, the method comprising:
   for a breakout cable having a first end and a second end, wherein the first end defines a breakout end that includes a plurality of independent breakout connectors, identifying a sequence for adding or removing connections involving the breakout connectors of the breakout cable;
   identifying distinct events associated with adding or removing connections involving each of the breakout connectors of the breakout cable; and
   associating each of the breakout connectors of the breakout cable with added or removed connections based on the identified sequence and the identified distinct events.

2. The method of claim 1, further comprising determining that a breakout type of cable is being used for the added or removed connections.

3. The method of claim 2, wherein determining that the breakout type of cable is being used for the added or removed connections comprises:
   receiving, via at least one controller of the AIM system, a user input indicating that the breakout type of cable is being used for the added or removed connections.

4. The method of claim 1, wherein the method is performed by at least one controller included in the AIM system.

5. The method of claim 4, wherein the at least one controller comprises at least one of: a panel controller, a rack controller, a system manager executing on a computer, and an application executing a portable computing device.

6. The method of claim 1, wherein identifying the sequence for adding or removing connections involving the breakout connectors of the breakout cable comprises:
   before adding or removing a connection involving one of the breakout connectors of the breakout cable, identifying the breakout connector that will be involved in the adding or removing of that connection.

7. The method of claim 1, wherein identifying events associated with adding or removing connections involving the breakout connectors of the breakout cable comprises at least one of:
   receiving data derived from sensing, via a sensor associated with a port, that a connection has been added or removed from the port; and
   receiving a user input indicating that a connection has been added or removed from a port.

8. The method of claim 7, wherein receiving the user input indicating that the connection has been added or removed from the port comprises at least one of:
   receiving data indicating that a button has been pressed, the button associated with a port to which a connector at the second end of the breakout cable is connected or from which the connector at the second end of the break cable was recently removed; and
   receiving a user input via at least one controller of the AIM system.

9. The method of claim 1, wherein the breakout cable comprises a non-breakout connector at the second end of the breakout cable.

10. The method of claim 1, wherein the breakout cable comprises at least one of a fiber breakout cable and a copper break out cable.

11. The method of claim 10, wherein the fiber breakout cable comprises a multi-fiber push on (MPO) breakout cable.

12. A system comprising:
    a plurality of items of patching equipment, each of which comprises a plurality of ports; and
    at least one controller comprising a display device and a user-input device;
    wherein the controller is configured to track connections made using a breakout cable, the breakout cable having a first end and a second end, wherein the first end defines a breakout end that includes a plurality of independent breakout connectors, by:
identifying a sequence for adding or removing connections involving the breakout connectors of the breakout cable;
identifying distinct events associated with adding or removing connections involving the breakout connectors of the breakout cable; and
associating each of the breakout connectors of the breakout cable with added or removed connections based on the identified sequence and the identified distinct events.

13. The system of claim 12, wherein the controller is further configured to determine that a breakout type of cable is being used for the added or removed connections.

14. The system of claim 13, wherein the controller is configured to determine that the breakout type of cable is being used for the added or removed connections by receiving, via the user-input device, a user input indicating that the breakout type of cable is being used for the added or removed connections.

15. The system of claim 12, wherein the at least one controller comprises at least one of: a panel controller, a rack controller, a system manager executing on a computer, and an application executing a portable computing device.

16. The system of claim 12, wherein the controller is configured to identify the sequence for adding or removing connections involving the breakout connectors of the breakout cable by:
before adding or removing a connection involving one of the breakout connectors of the breakout cable, identifying the breakout connector that will be involved in the adding or removing of that connection.

17. The system of claim 12, wherein the controller is configured to identify events associated with adding or removing connections involving the breakout connectors of the breakout cable by doing at least one of:
receiving data derived from sensing, via a sensor associated with a port of at least one item of patching equipment, that a connection has been added or removed from the port; and
receiving a user input indicating that a connection has been added or removed from a port.

18. The system of claim 17, wherein the controller is configured to receive the user input indicating that the connection has been added or removed from the port by at least one of:
receiving data indicating that a button has been pressed, the button associated with a port to which a connector at the second end of the breakout cable is connected or from which the connector at the second end of the break cable was recently removed; and
receiving a user input via the user-input device.

19. The system of claim 12, wherein the breakout cable comprises a non-breakout connector at the second end of the breakout cable.

20. The system of claim 12, wherein the breakout cable comprises at least one of a fiber breakout cable and a copper break out cable.

21. The system of claim 20, wherein the fiber breakout cable comprises a multi-fiber push on (MPO) breakout cable.

* * * * *